3,015,200
SIDE-DELIVERY RAKES
Cornelis van der Lely and Ary van der Lely, Maasland, Netherlands, assignors to C. van der Lely N.V., Maasland, Netherlands, a company of the Netherlands
Filed Mar. 18, 1958, Ser. No. 722,326
Claims priority, application Netherlands Mar. 25, 1957
5 Claims. (Cl. 56—377)

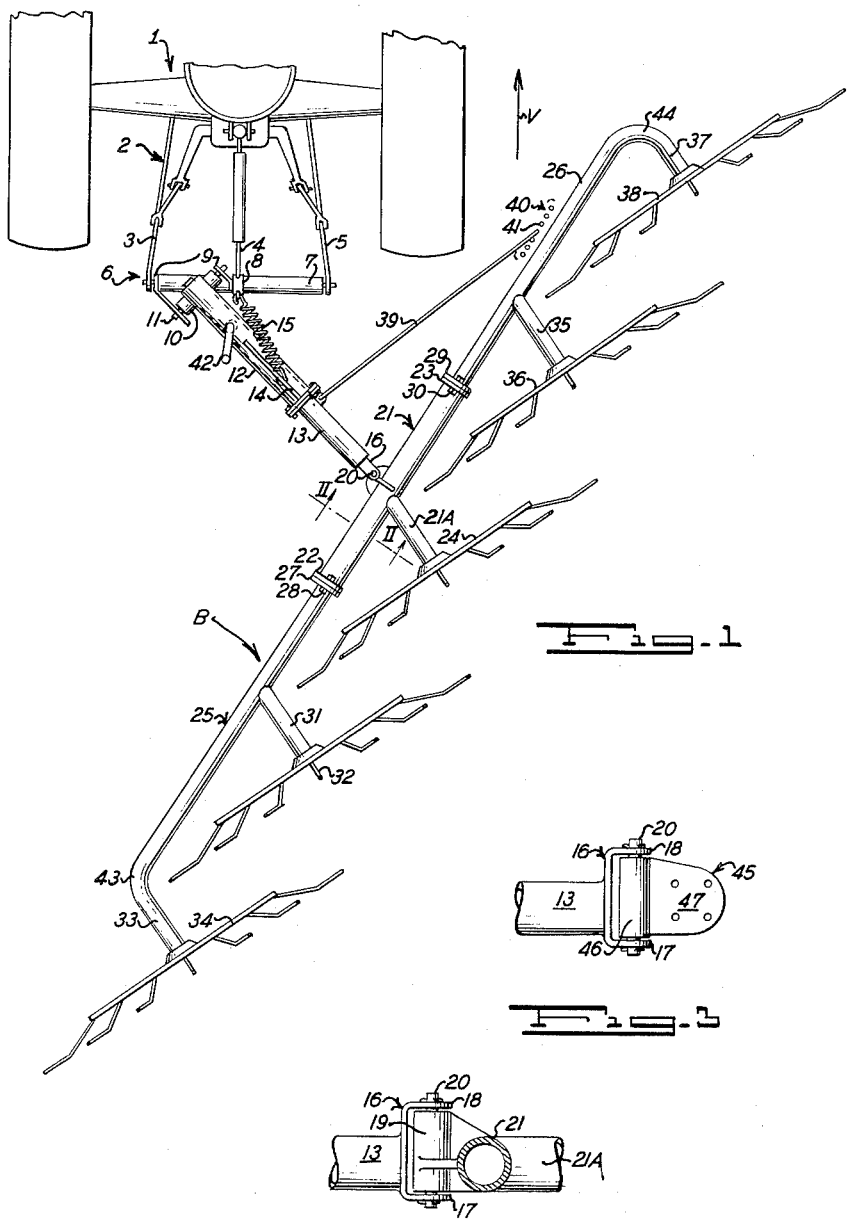

This invention relates to a side-delivery rake of the kind comprising a row of rake wheels each of which is supported for rotation about its axis upon a beam extending along the row and adapted to be connected with a tractor.

With these side-delivery rakes it is in many cases desirable to have the possibility of enlarging the working width of the rake by providing one or more additional rake wheels.

The invention has for its object to afford the possibility of increasing the number of rake wheels in a simple manner, whereby the advantages of the original rake can be maintained.

It is a further object of the invention that the construction should be attachable to existing rakes, without difficulties for overloading the frame of these rakes.

In accordance with the invention there is provided a side-delivery rake of the kind referred to, wherein said beam is formed as a composite beam consisting of members joined end to end, there being two such members between which is detachably arranged an intermediate third member carrying at least one rake wheel.

It is an advantage of a construction according to the invention that when the row of rake wheels is balanced mounted to a tractor the intermediate third member does not disturb the equilibrium.

The mounting of the intermediate third member according to the invention has the further advantage that the other frame members will not be overloaded, as could be the case if the third member should be connected to the end of the frame beam.

The intermediate third member could be manufactured of a heavier tube as the members attached to the ends of the third member.

A further advantage is the easy shipment of the dismounted members.

In an advantageous embodiment of the invention the intermediate member has a vertical pivot about which the position of the rake wheels relative to the afore-mentioned horizontal axis can be adjusted.

For a better understanding of the invention and to show how the same may be carried into effect, reference will now be made to the accompanying drawing in which:

FIGURE 1 is a plan view of a device according to the invention,

FIGURE 2 is a sectional view to an enlarged scale of a detail of the device shown in FIGURE 1, taken along the line II—II, and FIGURE 3 is a side view of an auxiliary attachment for use with the device shown in FIGURE 1.

Referring to FIGURE 1, a tractor 1 is provided with the usual lifting means 2. The arms 3, 4 and 5 of the lifting means 2 are connected with a side-delivery rake by means of a coupling device 6. The latter comprises a horizontal beam 7, the ends of which are secured to the arms 3 and 5. On the horizontal beam 7 is arranged a vertical beam 8, the top end of which is connected with the arm 4. Strips 9 are secured to the beams 7 and 8 and support a substantially horizontal shaft 11 on which a bearing 10 is rotatably arranged. A sleeve 12 is mounted on the bearing 10, and has journalled therein the horizontal tow-bar or draw means 13 of the side-delivery rake. A strip 14 is secured upon the sleeve 12, one end of a draw-spring 15 being attached to the strip 14, the other end of the spring being attached to the top of the beam 8 so that the side-delivery rake is resiliently displaceable about the shaft 11. The rear end of the tow-bar 13 has a trunnion bracket 16 secured thereon (see also FIG. 2), such bracket having spaced extensions 17 and 18 between which a bearing 19 is rotatably supported on a pin 20. The bearing 19 is secured to a tubular intermediate member or frame section 21, which is provided at its ends with flanges 22 and 23. At the center of the intermediate or central member 21 a shaft 21A is secured for rotatable support of a rake wheel 24. Tubular end members or frame sections 25 and 26 are secured to the intermediate member 21 the three members forming together a single longitudinal composite mobile frame beam B. The member 25 is provided with a flange 27, which is connected by fastening members or bolts 28 (diagrammatically illustrated) with the flange 22 of the intermediate member 21. The member 26 is likewise provided with a flange 29, which is connected by fastening members or bolts 30 with the flange 23 of the intermediate member 21. The member 25 has a shaft 31 secured thereto for rotatable support, of a rake wheel 32. The free end of the member 25 is bent over to constitute a shaft 33 for a rake wheel 34. In like manner the member 26 has shafts 35 and 37 for rake wheels 36 and 38.

In order to prevent the composite beam from moving about the vertical pivot pin 20, a stay rod 39 is arranged between the tow-bar 13 and the member 26. The stay rod 39 is connected with the member 26 by means of a strip 40, which is secured to the member 26, and which is formed with a series of holes 41. By inserting the end of the rod 39 into a different hole 41, the position of the rake wheels arranged on the longitudinal composite beam can be varied with respect to the tow-bar 13. The latter can be prevented from turning in the sleeve 12 by means of a locking pin 42, which is passed through registering holes (not shown) in the sleeve 12 and the tow-bar 13. The hole in the bar 13 through which the locking pin 42 passes, is larger than is necessary to accommodate the locking pin 42. Thus the bar 13 when engaged by the pin can still turn through a small angle relatively to the sleeve 12, so that during the working travel of the device, the rake wheels can move to compensate for ground irregularities. This movement compensation of the rake wheels whereby they adapt their positions to the ground over which they travel, usually requires that the composite beam and rake wheels should be in equilibrium about the bar 13, so that the bar 13 is secured to the centre of the intermediate member 21. In some cases it may however, be required that, for example, the rearmost rake wheels should bear more heavily on the ground than the forward rake wheels. This requirement can be met by appropriately disturbing the equilibrium of the rake wheels about the horizontal draw-bar 13.

During working travel of the device in the direction V, the rake wheels will all co-operate to deliver the crop to the left-hand side, so that the device operates as a side-delivery rake. By turning the bar 13 with the rake wheels through 180° in the sleeve 12, the rake can be brought to a different working position. In this further working position the rake wheels will each independently displace the crop to one side, so that the device constitutes a tedder. In order to turn the bar 13 with the rake wheels through 180° in the sleeve 12, the latter is raised with the aid of the lifting means 2, after which the bar 13 can be turned in the sleeve 12 without causing the rake wheels to encounter the ground. When the rake wheels are in equilibrium about the bar 13, the rotation in the sleeve 12 can be carried out without expending much energy.

In order to prevent the crop from adhering to protruding or angular parts of the device during employment of the latter, the free extremities of the end members 25 and 26 are gently curved at 43 and 44.

The number of rake wheels of the device shown in FIGURE 1 may be reduced simply by removal of the intermediate member 21 from between the end members 25 and 26 of the composite beam. To effect this the bolts 29 and 30 are removed, as also the pin 20. In order to connect the members 25 and 26 with the bar 13, an auxiliary attachment 45 (see FIG. 3) is arranged on the end of the bar 13. This attachment consists of a bearing 46 and a flange 47, the bearing 46 being secured between the cheeks 17 and 18 by means of the pin 20, whilst the flanges 27 and 29 are bolted to the flange 47.

Although in the described embodiment the intermediate member has only one rake wheel thereon, it will be obvious that the intermediate member may be longer and be provided with a plurality of rake wheels.

What we claim is:

1. Apparatus for displacing material lying on the ground comprising draw means, three frame sections, at least one rake wheel on each section, means connecting said sections together in fixed relation with said rake wheels operatively related for displacing said material, and means on said draw means coupling said sections thereto, said sections being adapted for connection in end-to-end relation whereby there are two end and one central section, said apparatus being further adapted such that said end sections are connectable directly together in end-to-end relation to make the lateral extent of the apparatus narrower.

2. Apparatus as claimed in claim 1 wherein each said means connecting the sections comprises a flange on each section connected thereby and fastening means to connect the flange.

3. Apparatus as claimed in claim 1 wherein the means on said draw means is a pivot means.

4. Apparatus as claimed in claim 3 including means connected between said draw means and one of said sections to fix the relative positions thereof.

5. Apparatus as claimed in claim 1 wherein said sections are substantially rectilinear sections connected in rectilinear alignment.

References Cited in the file of this patent

FOREIGN PATENTS

| | | |
|---|---|---|
| 1,095,043 | France | Dec. 15, 1954 |
| 1,108,945 | France | Sept. 14, 1955 |
| 1,139,762 | France | Feb. 18, 1957 |